United States Patent

Harvell et al.

[11] Patent Number: 6,005,859
[45] Date of Patent: *Dec. 21, 1999

[54] PROXY VAT-PSTN ORIGINATION

[75] Inventors: Joseph Harvell, Austin; Gregory T. Stovall, Garland, both of Tex.

[73] Assignee: Northern Telecom Limited, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/781,943

[22] Filed: Dec. 19, 1996

[51] Int. Cl.$^6$ .............................. H04L 12/28; H04J 3/12; H04J 3/16; H04M 3/42

[52] U.S. Cl. .................. 370/352; 370/410; 370/522; 379/215; 379/216; 379/217; 379/218

[58] Field of Search ..................................... 370/352, 353, 370/380, 389, 392, 396, 401, 404, 427, 435, 450, 465, 485, 410, 522, 524, 467; 379/90.01, 93.01, 93.05, 93.09, 100.15, 100.16, 230, 215, 216, 217, 218

[56] References Cited

U.S. PATENT DOCUMENTS

| | | | |
|---|---|---|---|
| 4,771,425 | 9/1988 | Baran et al. | 370/85 |
| 5,526,353 | 6/1996 | Henley et al. | 370/60.1 |
| 5,583,920 | 12/1996 | Wheeler, Jr. | 379/88 |
| 5,608,446 | 3/1997 | Carr et al. | 348/6 |

OTHER PUBLICATIONS

IETF Network Working Group, Sep. 28, 1993.
International Telecommunication Union, *Digital Subscriber Signalling System No. 1 Network Layer*, Mar. 1993, pp. i–iii and 1–251.
Network Working Group Audio–Video Transport Working Group, *RTP: A Transport Protocol for Real-Time Applications*, Jan. 1996, pp. 1–75.

*Primary Examiner*—Chau Nguyen
*Assistant Examiner*—Allan Hoosain
*Attorney, Agent, or Firm*—Haynes and Boone, L.L.P.

[57] ABSTRACT

System and method for extending the use of a VAT telephony application to originate calls into a PSTN as well as a computer network are disclosed. In a preferred embodiment, an adjunct application, referred to as a VAT signaling program ("VSP") running on the same host computer as a conventional VAT-based telephony application prompts a user to enter a destination telephone number and uses the entered number to generate a Q.931 SETUP message, which is encapsulated in a nonstandard, undefined, VAT control message (the "VAT Q.931 message") created to enable additional signaling information to be sent. A signaling interface to the PSTN serving the designated telephone number signals to the VAT application software exactly as if the signaling interface were actually another VAT application software originating a call to the naive VAT application. The signaling interface waits until the user at the computer "answers," and then originates the call into the PSTN network.

17 Claims, 4 Drawing Sheets

PROXY VAT-PSTN ORIGINATION

TECHNICAL FIELD

The invention relates generally to computer telephony applications and, more particularly, to a system for enabling computer-to-telephone and telephone-to-computer communications via a computer network.

BACKGROUND OF THE INVENTION

Applications currently exist for enabling computer-to-computer telephony applications using a protocol know as Video Audio Tool or "VAT", which is a product of the Network Research group of Lawrence Berkeley National Laboratory. Particulars of the VAT protocol are well known in the art and are therefore not further described herein. Examples of such applications include "DigiPhone for Mac," available from Third Planet Publishing of Dallas, Tex., and designed for use with Macintosh computers, and "Internet Phone," available from Vocaltec of Northvale, N.J., and designed for use with IBM-compatible PCs. Typically, such communication between computers occurs over a wide area network ("WAN"), such as the Internet.

As described above, there are various applications for enabling telephonic communication between two computers; however, it will be recognized that there are many situations in which it would be useful to enable a computer to communicate directly with a telephone via a public switched telephone network ("PSTN"). For example, in a situation where a user has only a single telephone line, is using his computer to access the Internet and needs to make a telephone call to a third party who does not have computer or whose computer is not logged on to the Internet at the present time, it would be advantageous for the user to be able to call the third party's telephone from his or her computer via the Internet.

Presently, VAT-based TCP/IP telephony applications use signaling protocols designed exclusively for signaling on a computer network, such as the Internet. These signaling protocols are minimal and are inadequate to originate telephone call into a PSTN.

Because VAT is a telephony protocol designed to enable computer-to-computer telephony applications via a computer network, such as the Internet, it does not enable the originator of a call to send adequate information into the network to originate a call into a PSTN. At least some VAT applications do support a minimal text description of the caller to be included in the info field of the VAT ID message, which is the message VAT uses to originate a call. Accordingly, it would be possible for a system to be designed that requires the user to place the PSTN destination telephone number in the info field to originate a call to a PSTN endpoint. However, the amount and nature of the information that may be sent in this manner is limited. Furthermore, applications that implement the VAT signaling protocol typically do not enable a user to modify the info field, and, since this field is intended to be used to provide information about the originator, it is common for a vendor of the application to hard code the name of the registered user of the software into this field as a means of copy protection.

Accordingly, what is needed is a system for extending the use of a VAT TCP/IP telephony application to originate calls into a PSTN, as well as a computer network, by extending the VAT signaling protocol.

SUMMARY OF THE INVENTION

The present invention, accordingly, provides a system and method for extending the use of a VAT telephony application to originate calls into a PSTN as well as a computer network. In a departure from the art, an adjunct application, referred to as a VAT signaling program ("VSP") running on the same host computer as a conventional VAT-based telephony application prompts a user to enter a destination telephone number and uses the entered number to generate a Q.931 SETUP message.

In a preferred embodiment, the Q.931 SETUP message thus generated is encapsulated in a nonstandard, or undefined, VAT control message (hereinafter "VAT Q.931 message") created to enable additional signaling information to be sent. Heretofore, only three control messages have been defined for VAT, including an ID message, a DONE message, and a IDLIST message. The VAT Q.931 message comprises a VAT control header with a message type field indicating that it is a VAT Q.931 message and a single information element, which is any valid Q.931 message.

A signaling interface to the PSTN serving the designated telephone number decodes the VAT Q.931 message and originates a call into the PSTN. Before doing this, however, the signaling interface signals to the naive VAT application software exactly as if the signaling interface were actually another VAT application software originating a call to the naive VAT application. The signaling interface waits until the user at the computer "answers," and then originates the call into the PSTN network.

A technical advantage achieved with the invention is that it enables a user to call a telephone using his or her computer.

Another technical advantage achieved with the invention is that it can be used with any VAT application.

Another technical advantage achieved with the invention is that the user need not be able to modify the info field of a VAT application's ID messages to achieve appropriate signaling.

Another technical advantage achieved with the invention is that the VAT application software need not be modified in order to send non-text data in an origination.

Another technical advantage achieved with the invention is that information about the state of the call into the PSTN, such as "calling 214/844-1234", "calling cell phone", or "forwarded to", is quickly relayed to the user through the info field of the VAT ID message that is being sent from the signaling interface to the VAT application software once the PSTN origination has begun.

DESCRIPTION OF THE PREFERRED EMBODIMENT

Figure 1:
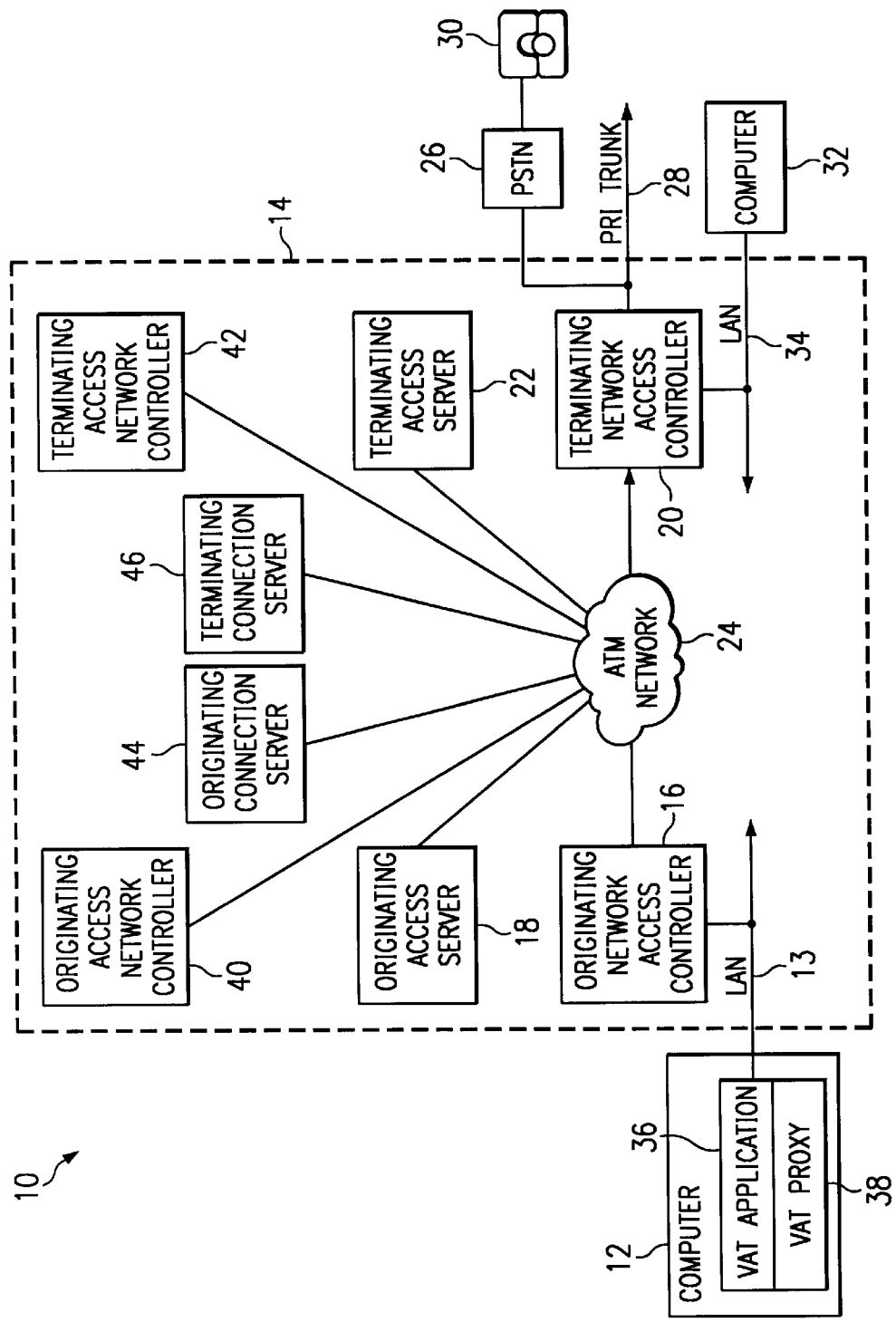
FIG. 1 is a block diagram of the hardware environment in which the present invention is preferably implemented.

Referring to FIG. 1, a preferred hardware environment for implementing the system of the present invention is generally designated by a reference numeral 10. The hardware environment 10 includes a computer 12 connected via a LAN 13 to a signaling interface 14 comprising an originating network access controller ("ONA") 16, an originating access server ("OAS") 18, a terminating network access controller ("TNA") 20, and a terminating access server ("TAS") 22 all interconnected via a wide area network, such as an asynchronous transfer mode ("ATM") network 24. At least one public switched telephone network ("PSTN"), represented in FIG. 1 by a PSTN 26, is connected to the TNA 20 of the signaling interface 14 via a PRI trunk 28. Alternatively, the PSTN 26 may be connected to the TNA 20 via an SS7 interface (not shown) rather than the PRI trunk 28. A plurality of telephones, represented by a telephone 30, are connected to the PSTN 26 for purposes generally known in the art. In addition, a second computer 32 may be connected to the TNA 20 via a second LAN 34.

VAT application software 36 is installed on the computer 12. It will be recognized that such software 36 may be, for example, software commercially available as "Internet Phone," available from Vocaltec, if the computer 12 is a IBM-compatible type computer, or "DigiPhone for Mac," available from Third Planet Publishing, if the computer 12 is a Macintosh computer. It will be understood that a main purpose of the VAT application software 36 is to enable audio communication between the computer 12 and another computer, such as the computer 32, via a computer network, such as the ATM network 24. However, the VAT application software 36 cannot enable communication between the computer 12 and a telephone, such as the telephone 30, because it does not enable a user to send adequate information into the network 24 to originate a call to the PSTN 26.

In addition, for purposes that will be described in greater detail below, an originating access network controller ("OANC") 40 and a terminating access network controller ("TANC") 42 and an originating connection server ("OCS") 44 and terminating connection server ("TCS") 46 are connected to the ATM network 24.

Figure 2:
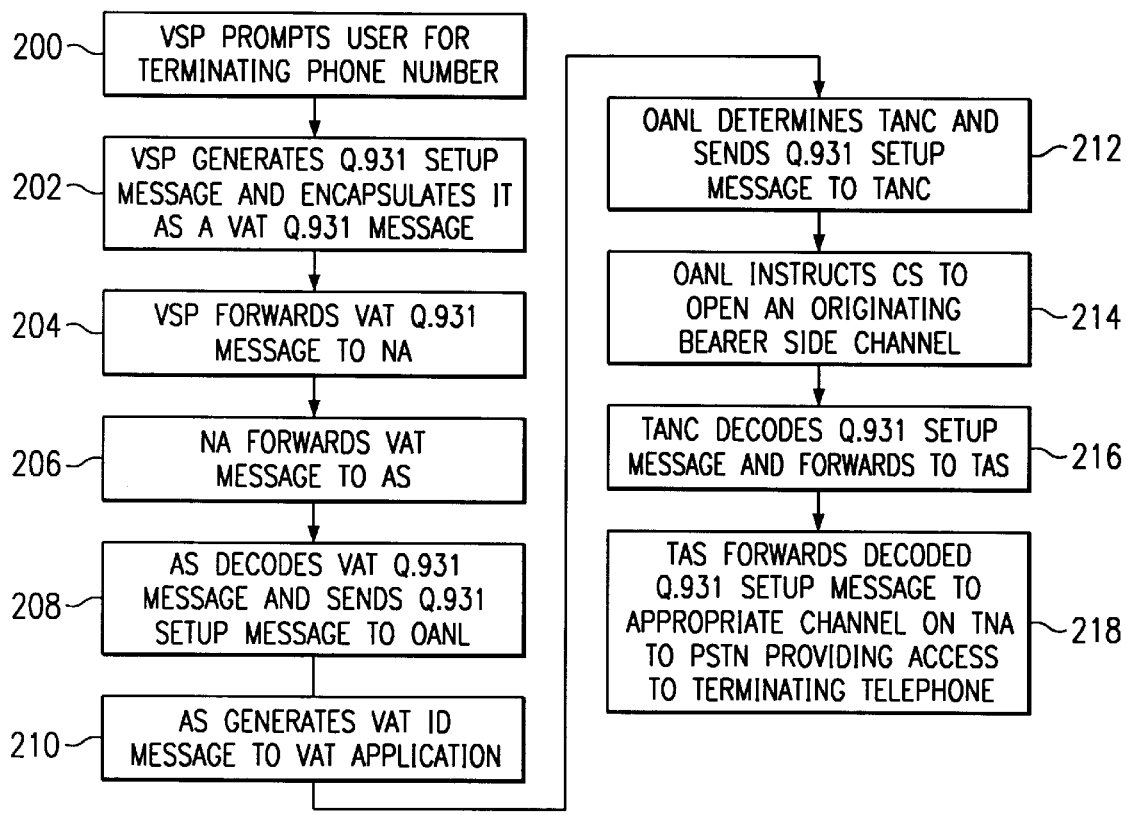
FIG. 2 is a flowchart of the operation of the present invention.

Accordingly, also installed on the computer 12 is VAT proxy software ("VPS") 38, the operation of which is described in greater detail in connection with FIGS. 2 and 3. In general, the VPS 38 uses an out-of-band signaling channel to provide the additional information necessary to originate a call into the PSTN 26 from the computer 12.

Details regarding the operation and function of the elements of the signaling interface 14 will be apparent to those skilled in the art and will therefore not be described herein in great detail. In general, the function of the ONA 16 and TNA 20 is to provide bearer channel translation from a LAN-style packet network used in computer applications to a time division multiplex network used in telecommunications applications. Similarly, the OAS 18 and TAS 22 may perform protocol signaling translations from VAT, used in computer network applications, to primary rate interface ("PRI"), SS7 or other telecommunications protocols. In the illustrated embodiment, only the OAS 18 will translate the VAT protocols to PRI or SS7, such that no device on the terminating side will even be aware that the originating device is a computer rather than a telephone. The OANC 40 and TANC 42 control the operations of the entire access network of which the computer 12 forms a part. In particular, the OANC 40 and TANC 42 handles administration and resource allocation, as well as providing address resolution capabilities. Each ANC also controls multiple NACs, ASs and CSs. The operation of the VPS 38 will now be described in greater detail with reference to FIG. 2. Execution begins when a user initiates the VPS 38. In step 200, the user is prompted to enter a destination telephone number, such as the telephone number of the telephone 30. In step 202, the VPS 38 generates a Q.931 SETUP message containing the bearer capability, the destination telephone number and the originating computer network access and then encapsulates the Q.931 SETUP message as an nonstandard control message, herein referred to as a "VAT Q.931" message. The format of the VAT Q.931 message comprises an indication of the protocol ("proto") (1 byte) call reference length ("crlen") (in bytes) call reference flag ("cref_flag") (1 bit) call reference value ("cref_value") (1 or 2 bytes), message type ("msgtype") (e.g., SETUP), identifier of information element ("IEident") (e.g., brCap), length of information element ("IElen") (in bytes), and the information element value ("IEval") (remainder of the message). The message header consists of the protocol, call reference length, call reference flag, call reference value and message type. The data fill for the header of the VAT Q.931 message is:

proto=0x80 crlen=0x01 cref_flag=0% cref_val=0% msgtype=0x05 such that the complete header would be:

0x08, 0x01, 0x00, 0x05

The remainder of the message consists of the three IEs and is data filled depending on the type of IE. For example, the data fill for a bearer capability IE might be:

IEident=0x04

IElen=0x02

IEval=0x91, 0x40 such that the complete bearer capability IE would be:

0x04, 0x02, 0x91, 0x40

Similarly, the data fill for a calling party number IE might be:

IEident=0x6C

IElen=0x11

IEval=0x00, 0x01, "47.71.4.98:3457"

such that the complete calling party number IE would be:

0x6C, 0x11, 0x00, 0x01x0x34, 0x37, 0x2E, 0x37, 0x31, 0x2E, 0x34, 0x2E, 0x39, 0x38, 0x3A, 0x33, 0x34, 0x35, 0x37

Finally, the data fill for a called party IE might be:

IEident=0x70

IElen=0x0b

IEval=0x41, "2146846668"

such that the complete called party IE would be:

0x70 , 0x0b, 0x41, 0x32 , 0x31, 0x34, 0x36, 0x38, 0x34, 0x36, 0x36, 0x36, 0x38

In step 204, the VPS 38 sends the VAT Q.931 message to the defined VAT control port (not shown) on the ONA 16. In step 206, the ONA 16 forwards the VAT message traffic, which includes all VAT protocol messages, to the access server serving the ONA 16, in this case, the OAS 18. In step 208, the OAS 18 decodes the encapsulated Q.931 SETUP message from the VAT Q.931 message and forwards the Q.931 SETUP message to the OANC 40. It will be recognized that, while it is the OAS 18 that actually decodes the VAT protocol messages, the ONA 16 is responsible for handling the bearer channel and providing the physical interface to the signaling channel. In step 210, the OAS 18 generates a VAT ID message to the VAT application software 36. This step results in the generation of a pseudo call that appears to the VAT application software 36 as an inbound call.

The remaining steps are not unique to the present invention, but are included to provide a full understanding of the invention. In step 212, the OANC 40 determines the TANC 42 and sends a Q.931 SETUP message to the connection server thereof, i.e., the TCS 46. It should be understood that, if SS7 is the protocol being used, an SS7 IAM message will be sent in place of the Q.931 SETUP message. In step 214, the OANC 40 sends a message to the OCS 44 to instruct it to open an originating side bearer channel. In step 216, the TANC 42 decodes the received Q.931 SETUP (or SS7 IAM) message, determines the TAS 22 and forwards the message thereto. In step 218, the TAS 22 forwards the received Q.931 SETUP (or SS7 IAM) message to the appropriate channel on the TNA 20 to the PSTN 26 providing access to the destination telephone 30.

As previously indicated, in a preferred embodiment, the Q.931 message is encapsulated in a nonstandard, i.e., undefined, VAT control message (the VAT Q.931 message) that enables extra signaling information to be sent. Currently, only three control messages are defined for VAT, including ID, DONE, and IDLIST. The VAT Q.931 message is a VAT control header with a message type field indicating that it is a VAT Q.931 message and three information-elements, including bearer capability, calling party number, and called party number.

Figure 3:
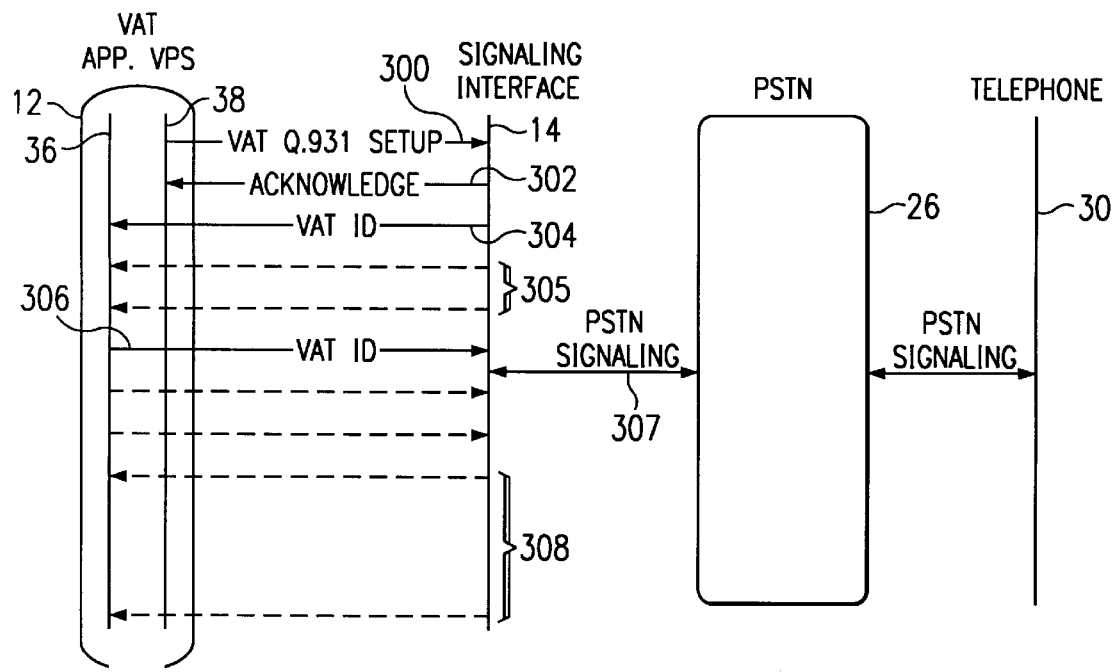
FIG. 3 further illustrates the operation of the present invention.

Referring now to FIG. 3, once the user enters the number of the terminating telephone, the VPS 38 sends a VAT.931 SETUP message to the signaling interface 14, as indicated by an arrow 300. Upon receipt of the VAT Q.931 SETUP message, the signaling interface 14 sends an acknowledgment to the VPS 38, as indicated by an arrow 302. The signaling interface 14 then decodes the VAT Q.931 SETUP message and sends a VAT ID message to the VAT application software 36, as indicated by an arrow 304. At this point the VAT application software 36 is "naive," i.e., it is unaware that a call has been originated by the VPS 38, exactly as if the signaling interface 14 were actually another VAT application (not shown) originating a call to the VAT application software 36. The signaling interface 14 continues to send VAT ID messages to the VAT application software 36 every two seconds, as indicated by the arrows 305, until the user at the computer 12 answers the call, resulting in a VAT ID message being sent from the VAT application software 36 to the signaling interface 14, as indicated by an arrow 306, and then originates a call into the PSTN 26 based on signaling information contained in the VAT Q.931 SETUP message, as indicated by an arrow 307. In addition, once the user answers the call, the frequency of the VAT ID messages from the signaling interface 14 to the VAT software 36 is reduced to every five (5) seconds, for example, as indicated by the arrows 308. At this point, the connection has been made and communication can take place between the computer 12 and the telephone 30.

Figure 4A:
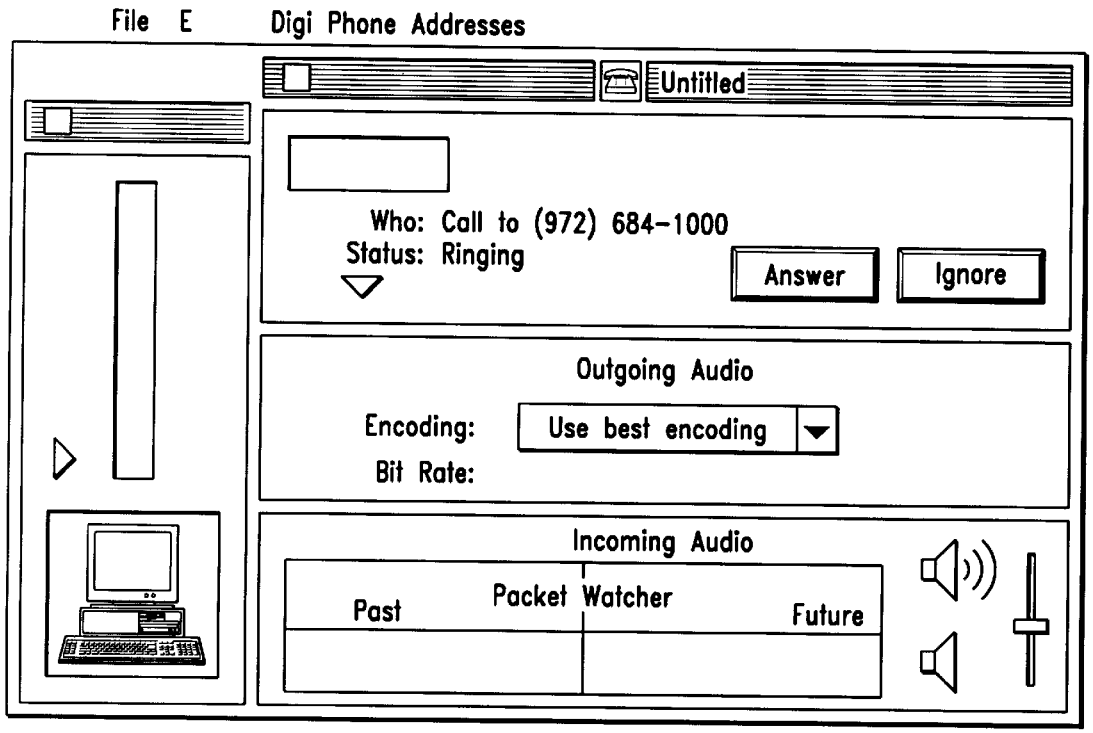
FIGS. 4A–4D are illustrative screen displays of the user interface of the present invention.

FIGS. 4A–4D are illustrative screen displays of the user interface of the VPS 38. FIG. 4A illustrates a call setup dialog box 400 of the VPS 38 for enabling a user to initiate a call from the computer 12, on which the VPS 38 is installed and the VAT application program 36 into the PSTN 26. As shown in FIG. 4A, the user is prompted, via the dialog box 400, to indicate whether the call is to be a direct or virtual private network ("VPN") call and to enter the number to call, for direct calls, or the VPN user ID and password, for VPN calls. Once the appropriate information is entered in the dialog box 400, the user can initiate the call by selecting a "Make Call" button 402.

Figure 4B:
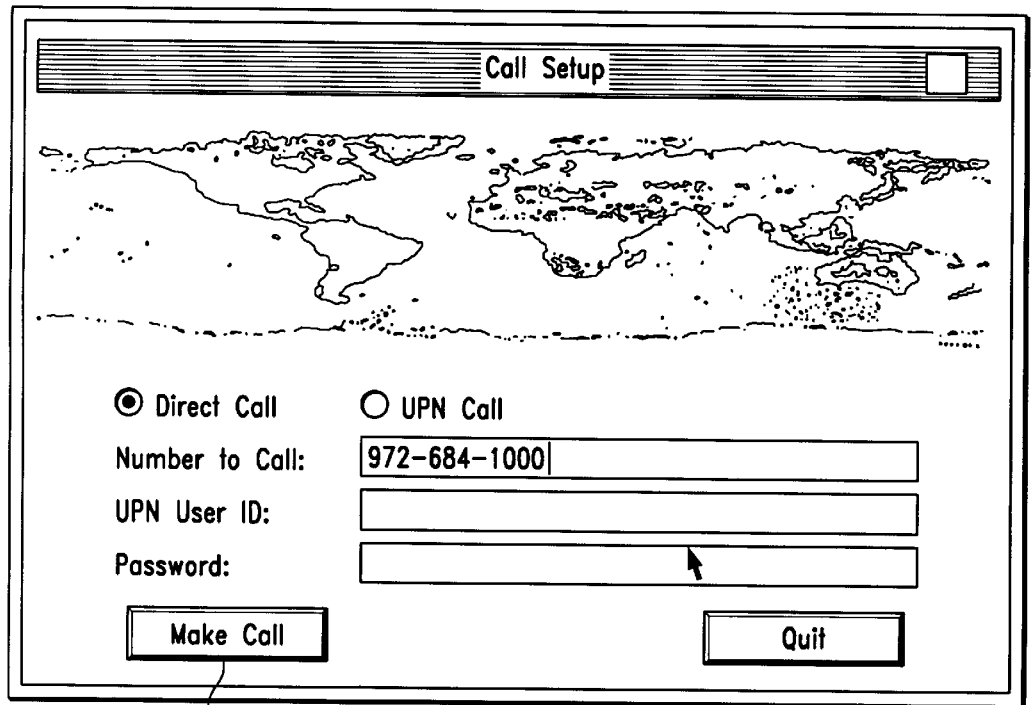
Figure 4C:
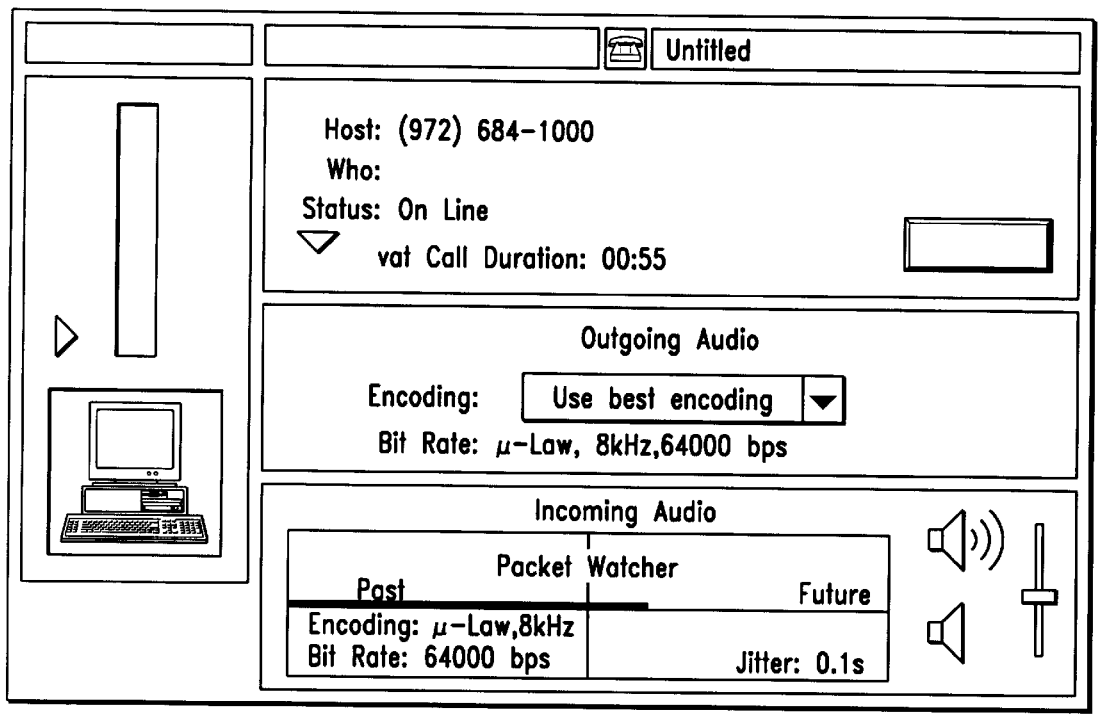
Figure 4D:
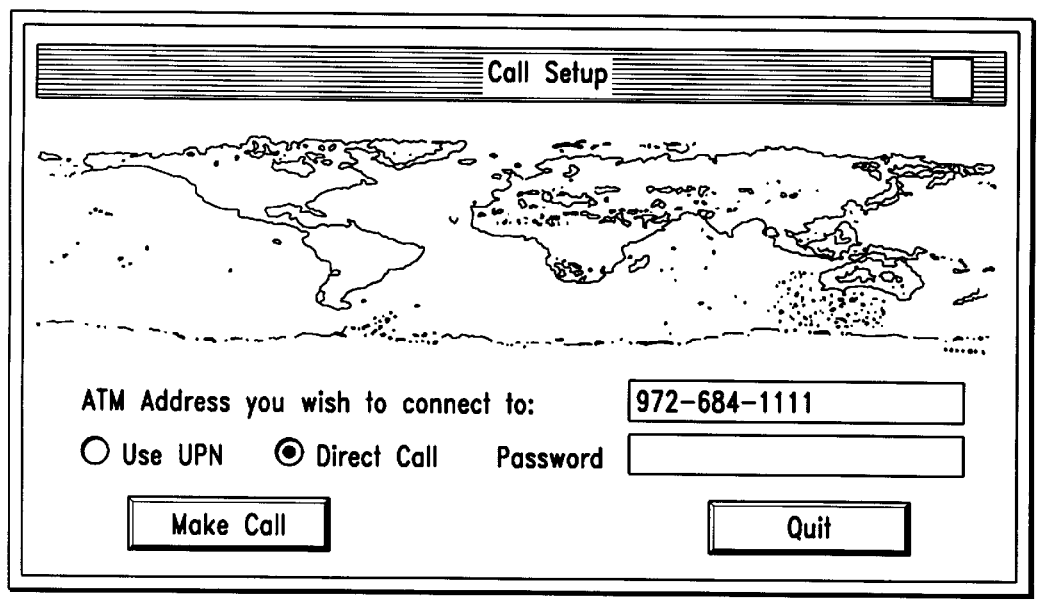

Once the user has selected the "Make Call" button 402, the screen of the computer 12 appears as illustrated in FIG. 4B while the connection between the computer 12 and the PSTN 26 is established as described above. FIG. 4C illustrates the appearance of the screen display of the computer 12 when the VAT application program 36 is in an active talking state. FIG. 4D illustrates an alternative embodiment of the dialog box 400 shown in FIG. 4A.

In an alternative embodiment, the functionality of the VPS 38 could be incorporated into the VAT application software 36, rather than being provided as a separate program. In order to accomplish this, the VAT Q.931 message would be written as an extension to the VAT protocol. Currently, three VAT message types are defined. The VAT Q.931 would be defined as a fourth type. Additionally, user interface options would be added to VAT application software to accept E.164 addresses (i.e., telephone numbers) as well as computer addresses. The program would then encode the new message, including the E.164 address, and send it in the normal control channels just as it currently does with message types 1–3. In this embodiment of the invention, because the VAT application software would be aware that it was originating a call, there would be no need for the OAS 18 to generate a pseudo-call back to the computer 12.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A method for enabling communications between a computer having a VAT application program installed thereon and a telephone via a combination of a wide area data network (WAN) and a public switched telephone network (PSTN), the method comprising:

prompting a user at said computer to use said computer to enter a telephone number identifying said telephone;

responsive to entry of said telephone number, encoding said telephone number as a VAT control message;

providing the VAT control message to a first controller connected between said computer and said WAN, decoding the VAT control message in said WAN to retrieve the telephone number;

providing the decoded telephone number to a second controller connected between said WAN and the PSTN, the PSTN being connectable to said telephone;

originating, from said first controller, a call to said VAT application program installed on said computer; and awaiting answer of said call by a user at said computer; and responsive to said call being answered, completing said call to the PSTN and to the telephone.

2. The method of claim 1 further comprising, prior to said prompting, executing said VAT application program.

3. The method of claim 1 wherein said VAT control message is a nonstandard VAT control message for enabling extra signaling information to be sent to said WAN.

4. Apparatus for enabling communications between a computer having a computer telephony application program utilizing a VAT messaging protocol installed thereon and a telephone via a computer network, the apparatus comprising:

means for prompting a user to use said computer to enter a telephone number identifying said telephone;

means for encoding said entered telephone number;

means for providing the encoded telephone number to a first signaling controller connected between said computer and said computer network;

means for decoding the telephone number in said computer network means for providing the decoded telephone number to a second signaling controller connected between said computer network and a public switched network (PSTN) servicing said telephone;

means for originating, at said computer, a call to said computer telephony application program installed on said computer; and means for completing said call into the PSTN responsive to a user at said computer answering said originated call.

5. The apparatus of claim 4 wherein said telephone number is encoded as a VAT control message.

6. The apparatus of claim 5 wherein said VAT control message is a nonstandard VAT control message.

7. The apparatus of claim 4 wherein said means for prompting comprises a dialog box displayed on said computer.

8. The apparatus of claim 4 wherein said means for originating a call to said computer comprises a signaling interface operating in said computer network.

9. The apparatus of claim 4 wherein said means for completing said call into said PSTN servicing said telephone comprises a signaling interface operating in said computer network.

10. In a telecommunications system including a wide area network ("WAN") connected to a public switched telephone network ("PSTN") through a first network access device, a method for enabling communications between a computer connectable to the WAN and a telephone connectable to the PSTN, the method comprising:

receiving a telephone number identifying the telephone into a proxy application program on the computer, the proxy application program utilizing a VAT messaging protocol;

generating a setup message by the proxy application program, the setup message including the telephone number;

sending the setup message to a second network access device in the WAN;

locating the first network access device;

originating a call from WAN to the computer utilizing the second network access device; and completing the call from the WAN to the telephone through the PSTN utilizing the first network access device.

11. The method of claim 10 further comprising sending the setup message from the second network access device to an originating server;

translating the setup message at the originating server;

determining a terminating server associated with the first network access device; and sending the translated setup message to the terminating server.

12. The method of claim 10 further comprising:

prompting a user at said computer to use said computer to enter the telephone number identifying said telephone.

13. The method of claim 10 wherein said telephone number is encoded as a VAT control message in the setup message.

14. The method of claim 13 wherein said VAT control message is a nonstandard VAT control message for enabling extra signaling information to be sent to said signaling interfaces.

15. The method of claim 10 wherein the first network access device utilizes a telecommunication protocol to interface with the PSTN.

16. The method of claim 15 wherein the telecommunication protocol is primary rate interface.

17. The method of claim 15 wherein the telecommunication protocol is signaling system 7.

* * * * *